United States Patent
Erickson et al.

(10) Patent No.: US 9,531,704 B2
(45) Date of Patent: Dec. 27, 2016

(54) EFFICIENT NETWORK LAYER FOR IPV6 PROTOCOL

(71) Applicant: Google Inc., Mountain View, CA (US)

(72) Inventors: Grant M. Erickson, Sunnyvale, CA (US); Christopher A. Boross, San Francisco, CA (US)

(73) Assignee: Google Inc., Mountain View, CA (US)

(*) Notice: Subject to any disclaimer, the term of this patent is extended or adjusted under 35 U.S.C. 154(b) by 109 days.

(21) Appl. No.: 13/926,312

(22) Filed: Jun. 25, 2013

(65) Prior Publication Data

US 2014/0376530 A1    Dec. 25, 2014

(51) Int. Cl.
| | | |
|---|---|---|
| *H04L 29/06* | (2006.01) | |
| *H04L 12/741* | (2013.01) | |
| *H04W 40/02* | (2009.01) | |
| *H04W 80/04* | (2009.01) | |
| *H04L 9/32* | (2006.01) | |
| *H04W 12/06* | (2009.01) | |
| *H04W 84/18* | (2009.01) | |
| *H04W 40/24* | (2009.01) | |

(Continued)

(52) U.S. Cl.
CPC ......... *H04L 63/0823* (2013.01); *H04L 9/3263* (2013.01); *H04L 45/741* (2013.01); *H04L 45/745* (2013.01); *H04W 12/06* (2013.01); *H04W 40/02* (2013.01); *H04W 80/045* (2013.01); *H04W 84/18* (2013.01); *H04L 63/061* (2013.01); *H04L 63/166* (2013.01); *H04W 40/24* (2013.01); *H04W 84/12* (2013.01)

(58) Field of Classification Search
None
See application file for complete search history.

(56) References Cited

U.S. PATENT DOCUMENTS

| | | |
|---|---|---|
| 6,101,188 A | 8/2000 | Sekine et al. |
| 6,101,545 A | 8/2000 | Balcerowski et al. |
| 6,484,200 B1 | 11/2002 | Angal et al. |

(Continued)

FOREIGN PATENT DOCUMENTS

KR    20120014887    2/2012

OTHER PUBLICATIONS

6LoWPAN, Wikipedia, pp. 1-4, http://en.wikipedia.org/w/index.php?title=6LoWPAN&oldid=622043786, Accessed Apr. 2, 2013.

(Continued)

*Primary Examiner* — Yemane Mesfin
*Assistant Examiner* — Peter Chen
(74) *Attorney, Agent, or Firm* — Wolfe-SBMC

(57) ABSTRACT

An electronic device may include a network interface that may enable the electronic device to wirelessly couple the electronic device to other electronic devices. The electronic device may also include a processor that may determine at least one data path to the other electronic devices using a Routing Information Protocol-Next Generation (RIPng) routing mechanism. After identifying at least one data path to the other electronic devices, the processor may determine whether the identified data path(s) is secure using a Datagram Transport Layer Security (DTLS) protocol. If the identified data path(s) is determined to be secure, the processor may send Internet Protocol version 6 (IPv6) data packets to the other electronic devices via the secure data path(s).

20 Claims, 9 Drawing Sheets

(51) Int. Cl.
*H04W 84/12* (2009.01)
*H04L 12/56* (2006.01)

(56) References Cited

U.S. PATENT DOCUMENTS

| | | |
|---|---|---|
| 7,035,634 B2 | 4/2006 | Mead et al. |
| 7,424,532 B1 | 9/2008 | Subbiah |
| 7,778,654 B2 | 8/2010 | Ahn et al. |
| 8,111,414 B2 | 2/2012 | Sato et al. |
| 8,301,432 B1 | 10/2012 | Gauvin |
| 8,504,017 B1 | 8/2013 | Hietalahti et al. |
| 8,514,777 B1 | 8/2013 | Zhao |
| 8,539,567 B1 | 9/2013 | Logue et al. |
| 8,635,373 B1 | 1/2014 | Supramaniam et al. |
| 8,681,807 B1 | 3/2014 | Zimerman |
| 9,036,529 B2 | 5/2015 | Erickson et al. |
| 9,036,632 B2 | 5/2015 | Erickson |
| 9,124,521 B2 | 9/2015 | Erickson et al. |
| 9,130,910 B1 | 9/2015 | Logue |
| 9,191,209 B2 | 11/2015 | Erickson et al. |
| 9,326,307 B2 | 4/2016 | Erickson et al. |
| 9,338,810 B2 | 5/2016 | Erickson et al. |
| 9,345,058 B2 | 5/2016 | Erickson et al. |
| 9,451,573 B2 | 9/2016 | Erickson et al. |
| 2002/0150103 A1 | 10/2002 | Hamamoto et al. |
| 2002/0184208 A1 | 12/2002 | Kato |
| 2003/0041119 A1 | 2/2003 | Bisdikian et al. |
| 2003/0135556 A1 | 7/2003 | Holdsworth |
| 2004/0008691 A1* | 1/2004 | Winter ............... H04L 45/122 370/395.31 |
| 2004/0031030 A1 | 2/2004 | Kidder et al. |
| 2004/0225885 A1 | 11/2004 | Grohoski et al. |
| 2005/0018632 A1 | 1/2005 | Lee et al. |
| 2005/0050004 A1 | 3/2005 | Sheu et al. |
| 2005/0135570 A1 | 6/2005 | Binning |
| 2005/0176418 A1 | 8/2005 | Leib et al. |
| 2005/0220139 A1 | 10/2005 | Aholainen |
| 2005/0228798 A1 | 10/2005 | Shepard et al. |
| 2005/0249122 A1* | 11/2005 | Wheeler ............... H04L 1/16 370/241 |
| 2006/0010217 A1 | 1/2006 | Sood |
| 2006/0067360 A1 | 3/2006 | Ohara |
| 2006/0259969 A1 | 11/2006 | Suh et al. |
| 2007/0054674 A1 | 3/2007 | Cohen et al. |
| 2007/0076684 A1 | 4/2007 | Lee et al. |
| 2007/0078986 A1 | 4/2007 | Ethier et al. |
| 2007/0081512 A1 | 4/2007 | Takeda et al. |
| 2007/0083788 A1 | 4/2007 | Johnson |
| 2007/0147255 A1 | 6/2007 | Oyman |
| 2007/0165592 A1* | 7/2007 | Gossain ............... H04L 45/00 370/349 |
| 2007/0253431 A1 | 11/2007 | Park et al. |
| 2008/0069137 A1 | 3/2008 | Jimmel |
| 2008/0086727 A1 | 4/2008 | Lam et al. |
| 2008/0141274 A1 | 6/2008 | Bhogal et al. |
| 2008/0291828 A1 | 11/2008 | Park |
| 2008/0304457 A1 | 12/2008 | Thubert et al. |
| 2009/0016226 A1 | 1/2009 | LaVigne et al. |
| 2009/0024498 A1 | 1/2009 | Berezuk et al. |
| 2009/0040103 A1 | 2/2009 | Chansarkar et al. |
| 2009/0077396 A1 | 3/2009 | Tsai et al. |
| 2009/0080013 A1 | 3/2009 | Sato et al. |
| 2009/0116463 A1 | 5/2009 | Hirano et al. |
| 2009/0135716 A1* | 5/2009 | Veillette ............... G01D 4/004 370/221 |
| 2009/0161578 A1* | 6/2009 | Yeung ............... H04L 45/02 370/254 |
| 2009/0185538 A1 | 7/2009 | Choi et al. |
| 2009/0195072 A1 | 8/2009 | Lee |
| 2009/0195407 A1 | 8/2009 | Nakano et al. |
| 2009/0201848 A1* | 8/2009 | Kumazawa et al. ........ 370/328 |
| 2009/0207821 A1 | 8/2009 | Rune |
| 2009/0249322 A1 | 10/2009 | Sugiyama et al. |
| 2009/0257380 A1* | 10/2009 | Meier ............... H04W 72/082 370/329 |
| 2009/0276451 A1 | 11/2009 | Shelby |
| 2009/0319848 A1 | 12/2009 | Thaper |
| 2009/0323690 A1 | 12/2009 | Lu et al. |
| 2009/0327515 A1 | 12/2009 | Price |
| 2010/0037057 A1 | 2/2010 | Shim et al. |
| 2010/0064029 A1 | 3/2010 | Lundberg et al. |
| 2010/0118869 A1 | 5/2010 | Li et al. |
| 2010/0153652 A1 | 6/2010 | Thomas et al. |
| 2010/0232433 A1 | 9/2010 | Morris |
| 2010/0238811 A1 | 9/2010 | Rune |
| 2010/0246480 A1* | 9/2010 | Aggarwal ............ H04L 45/123 370/328 |
| 2010/0262519 A1 | 10/2010 | Salomon et al. |
| 2010/0262650 A1 | 10/2010 | Chauhan et al. |
| 2010/0281424 A1 | 11/2010 | Vaysburg et al. |
| 2011/0021234 A1 | 1/2011 | Tibbitts et al. |
| 2011/0066051 A1 | 3/2011 | Moon et al. |
| 2011/0099545 A1 | 4/2011 | Lee et al. |
| 2011/0107098 A1* | 5/2011 | Hong et al. .................. 713/168 |
| 2011/0107165 A1 | 5/2011 | Resch et al. |
| 2011/0145381 A1 | 6/2011 | Saint-Hilaire |
| 2011/0149858 A1* | 6/2011 | Hwang ............... H04W 40/26 370/328 |
| 2011/0167133 A1 | 7/2011 | Jain |
| 2011/0169659 A1 | 7/2011 | Dalla et al. |
| 2011/0196925 A1 | 8/2011 | Hans et al. |
| 2011/0202656 A1 | 8/2011 | Gentile et al. |
| 2011/0202910 A1* | 8/2011 | Venkatakrishnan et al. .. 717/171 |
| 2011/0221590 A1 | 9/2011 | Baker |
| 2011/0225640 A1 | 9/2011 | Ganapathy et al. |
| 2011/0246646 A1 | 10/2011 | Nakhjiri et al. |
| 2011/0275384 A1 | 11/2011 | Barbeau et al. |
| 2012/0093508 A1 | 4/2012 | Baykal et al. |
| 2012/0106533 A1 | 5/2012 | Chen et al. |
| 2012/0179906 A1 | 7/2012 | Choi et al. |
| 2012/0197791 A1 | 8/2012 | Karner et al. |
| 2012/0207163 A1 | 8/2012 | Schrum |
| 2012/0226768 A1 | 9/2012 | Gaines et al. |
| 2012/0233674 A1 | 9/2012 | Gladstone et al. |
| 2012/0236824 A1 | 9/2012 | McCann et al. |
| 2012/0264443 A1 | 10/2012 | Ng et al. |
| 2012/0300778 A1 | 11/2012 | Tamura |
| 2012/0320924 A1 | 12/2012 | Baliga et al. |
| 2012/0329478 A1 | 12/2012 | Lee |
| 2013/0006400 A1 | 1/2013 | Caceres et al. |
| 2013/0036181 A1 | 2/2013 | Choi et al. |
| 2013/0036305 A1 | 2/2013 | Yadav et al. |
| 2013/0046872 A1 | 2/2013 | Seelman |
| 2013/0046893 A1 | 2/2013 | Hauser et al. |
| 2013/0078985 A1 | 3/2013 | Savolainen et al. |
| 2013/0083726 A1 | 4/2013 | Jain et al. |
| 2013/0117449 A1 | 5/2013 | Hares et al. |
| 2013/0136145 A1 | 5/2013 | Bi et al. |
| 2013/0142059 A1 | 6/2013 | Di Girolamo et al. |
| 2013/0171939 A1 | 7/2013 | Tian et al. |
| 2013/0201316 A1 | 8/2013 | Binder et al. |
| 2013/0242847 A1 | 9/2013 | Oh et al. |
| 2013/0276062 A1 | 10/2013 | Sarawat et al. |
| 2013/0326502 A1 | 12/2013 | Brusnsman et al. |
| 2013/0329557 A1* | 12/2013 | Petry et al. .................. 370/235 |
| 2013/0329605 A1 | 12/2013 | Nakil et al. |
| 2014/0003357 A1 | 1/2014 | Ejzak et al. |
| 2014/0004825 A1 | 1/2014 | Prakash et al. |
| 2014/0059531 A1 | 2/2014 | Lee et al. |
| 2014/0089671 A1 | 3/2014 | Logue et al. |
| 2014/0098762 A1 | 4/2014 | Ghai et al. |
| 2014/0108624 A1 | 4/2014 | Grundemann et al. |
| 2014/0120861 A1 | 5/2014 | Kwak et al. |
| 2014/0143855 A1* | 5/2014 | Keoh et al. .................. 726/14 |
| 2014/0181893 A1 | 6/2014 | Von Bokern et al. |
| 2014/0189790 A1 | 7/2014 | Mindler et al. |
| 2014/0233460 A1 | 8/2014 | Pettus et al. |
| 2014/0240105 A1 | 8/2014 | Brenner |
| 2014/0241146 A1 | 8/2014 | Mahadevan et al. |
| 2014/0247396 A1 | 9/2014 | Ohmae et al. |
| 2014/0250509 A1 | 9/2014 | Ansley |
| 2014/0256249 A1 | 9/2014 | Tse et al. |
| 2014/0269755 A1 | 9/2014 | Veiga |
| 2014/0270714 A1 | 9/2014 | Osminer et al. |

(56) References Cited

U.S. PATENT DOCUMENTS

| | | |
|---|---|---|
| 2014/0281804 A1 | 9/2014 | Resch |
| 2014/0282923 A1 | 9/2014 | Narayan et al. |
| 2014/0283004 A1 | 9/2014 | Moore |
| 2014/0289745 A1 | 9/2014 | Nirantar |
| 2014/0328343 A1 | 11/2014 | Kapadia et al. |
| 2014/0369267 A1 | 12/2014 | Ni et al. |
| 2014/0376405 A1 | 12/2014 | Erickson et al. |
| 2014/0376530 A1 | 12/2014 | Erickson et al. |
| 2014/0379817 A1 | 12/2014 | Logue et al. |
| 2015/0016407 A1 | 1/2015 | Erickson et al. |
| 2015/0016443 A1 | 1/2015 | Erickson et al. |
| 2015/0019223 A1 | 1/2015 | Chen et al. |
| 2015/0023293 A1 | 1/2015 | Erickson et al. |
| 2015/0023294 A1 | 1/2015 | Erickson et al. |
| 2015/0023339 A1 | 1/2015 | Erickson et al. |
| 2015/0026791 A1 | 1/2015 | Erickson et al. |
| 2015/0032898 A1 | 1/2015 | Tan |
| 2015/0109902 A1 | 4/2015 | Kumar |
| 2015/0249605 A1 | 9/2015 | Erickson et al. |
| 2015/0257190 A1 | 9/2015 | Erickson et al. |
| 2015/0326488 A1 | 11/2015 | Yousefi et al. |
| 2015/0365377 A1 | 12/2015 | Dvir et al. |
| 2016/0041821 A1 | 2/2016 | Erickson et al. |
| 2016/0113048 A1 | 4/2016 | Barathalwar |
| 2016/0227506 A1 | 8/2016 | Erickson et al. |

OTHER PUBLICATIONS

Seggelmann, Robin, Datagram Transport Layer Security, Version 1.0, License:UVM, CC-BY-ND, May 13, 2011, pp. 1-15, robin-seggelmann.de/papers/dtls.pdf.
OSI Model, Wikipedia, pp. 1-9, http://en.wikipedia.org/wiki/OSI_model, Accessed Apr. 2, 2013.
Rescorla, E. et al., Datagram Transport Layer Security, Network Working Group, RFC 4347, Standards Track, Apr. 2006, pp. 1-26, https://tools.ietf.org/html/rfc4347.
Forsberg, D. et al., Protocol for Carrying Authentication for Network Access (PANA), Network Working Group, RFC 5191, Standards Track, May 2008, pp. 1-47, https://tools.ietf.org/html/rfc5191.
Malkin, G., RIPng for IPv6, Network Working Group, RFC 2080, Standards Track, Jan. 1997, pp. 1-18, https://www.ietf.org/rfc/rfc2080.txt.
H3C, RIPng Technology White Paper, 2008, pp. 1-8, Hangzhou H3C Technologies Co., Ltd., www.h3c.com/portal/download.do?id=685058.
Watteyne, Thomas, RPL, Nov. 19, 2012, pp. 1-3, https://openwsn.atlassian.net/wiki/display/OW/RPL.
Routing Information Protocol, Wikipedia, http://en.wikipedia.org/wiki/Routing_Information_Protocol, Accessed Apr. 2, 2013.
U.S. Appl. No. 13/926,335, filed Jun. 25, 2013, Erickson et al.
F. Baker et al.; "Internet Protocols for the Smart Grid; rfc6272.txt;" Internet Protocols for the Smart Grid; Internet Engineering Task Force, IETF: Standard, Internet Society (ISOC), Geneva, Switzerland; Jun. 22, 2011; pp. 1-66.
M. Tariq et al.; "Smart Grid Standards for Home and Building Automation;" IEEE International Conference on Power System Technology (Powercon) 2012; Oct. 30, 2012; pp. 1-6.
Md. Sakhawat Hosse et al.; "Interconnection between 802.15.4 Devices and IPv6: Implications and Existing Approaches;" International Journal of Computer Science Issues (IJCSI); Jan. 1, 2010; pp. 19-31.
Thomas Kothmayer et al; "A DTLS based end-to-end security architecture for the Internet of Things with two-way authentication;" 2012 IEEE 37th Conference on Local Computer Networks Workshops, Oct. 22, 2012, pp. 956-963.
S. Keoh et al.; "Securing the IP-based Internet of Things with DTLS; draft-keo-lwig-dtls-iot-1.txt;" Internet Engineering Task Force, StandardWorkingDraft, Internet Society; Geneva, Switzerland, Feb. 25, 2013; pp. 1-20.

International Search Report and Written Opinion for PCT Application No. PCT/US2014/043691 dated Nov. 12, 2014; 10 pgs.
"Advisory Action", U.S. Appl. No. 14/506,199, Feb. 9, 2016, 2 pages.
"Final Office Action", U.S. Appl. No. 14/504,233, Jun. 17, 2015, 25 pages.
"Final Office Action", U.S. Appl. No. 14/506,199, Nov. 5, 2015, 8 pages.
"Final Office Action", U.S. Appl. No. 14/506,302, Jul. 1, 2015, 23 pages.
"First Action Interview Office Action", U.S. Appl. No. 14/506,302, Jan. 14, 2015, 6 pages.
"International Search Report", Application No. PCT/US2014/043699, Jan. 20, 2015, 5 pages.
"Invitation to Pay Additional Fees/Partial International Search Report", Application No. PCT/US2014/043699, Sep. 30, 2014, 7 pages.
"Non-Final Office Action", U.S. Appl. No. 13/926,335, Jan. 27, 2015, 9 pages.
"Non-Final Office Action", U.S. Appl. No. 14/506,199, Apr. 24, 2015, 9 pages.
"Notice of Allowance", U.S. Appl. No. 13/926,335, Jun. 26, 2015, 8 pages.
"Notice of Allowance", U.S. Appl. No. 14/506,199, Jan. 22, 2015, 8 pages.
"Notice of Allowance", U.S. Appl. No. 14/506,274, Jan. 21, 2015, 15 pages.
"Notice of Allowance", U.S. Appl. No. 14/712,377, Sep. 9, 2015, 8 pages.
"Notice of Allowance", U.S. Appl. No. 14/712,377, Dec. 23, 2015, 10 pages.
"Notice of Allowance", U.S. Appl. No. 14/712,436, Dec. 22, 2015, 12 pages.
"Notice of Allowance", U.S. Appl. No. 14/712,467, Jan. 12, 2016, 27 pages.
"Preinterview First Office Action", U.S. Appl. No. 14/506,199, Dec. 2, 2014, 4 pages.
"Preinterview First Office Action", U.S. Appl. No. 14/506,274, Dec. 3, 2014, 5 pages.
"Preinterview First Office Action", U.S. Appl. No. 14/506,302, Dec. 10, 2014, 4 pages.
"Preinterview First Office Action", U.S. Appl. No. 14/712,377, Jun. 16, 2015, 4 pages.
"Preinterview First Office Action", U.S. Appl. No. 14/712,436, Oct. 22, 2015, 4 pages.
"Preinterview First Office Action", U.S. Appl. No. 14/712,467, Oct. 2, 2015, 4 pages.
"Corrected Notice of Allowance", U.S. Appl. No. 14/712,377, Apr. 13, 2016, 2 pages.
"Corrected Notice of Allowance", U.S. Appl. No. 14/712,436, Mar. 31, 2016, 2 pages.
"Corrected Notice of Allowance", U.S. Appl. No. 14/712,467, Mar. 31, 2016, 2 pages.
"Corrected Notice of Allowance", U.S. Appl. No. 14/712,467, Apr. 22, 2016, 2 pages.
"Foreign Office Action", KR Application No. 10-2016-7001528, Mar. 25, 2016, 7 pages.
"Non-Final Office Action", U.S. Appl. No. 14/504,233, May 12, 2016, 16 pages.
"Non-Final Office Action", U.S. Appl. No. 14/506,199, Apr. 4, 2016, 11 pages.
"Non-Final Office Action", U.S. Appl. No. 14/506,302, Aug. 10, 2016, 19 pages.
"Notice of Allowance", U.S. Appl. No. 15/096,673, Jul. 27, 2016, 10 pages.
"Pre-Interview Communication", U.S. Appl. No. 15/096,673, Jun. 9, 2016, 3 pages.
Corrected Notice of Allowance, U.S. Appl. No. 15/096,673, Aug. 23, 2016, 2 pages.
Final Office Action, U.S. Appl. No. 14/506,199, Sep. 16, 2016, 11 pages.
Non-Final Office Action, U.S. Appl. No. 14/885,739, Sep. 2, 2016, 10 pages.

(56) References Cited

OTHER PUBLICATIONS

Notice of Allowance, U.S. Appl. No. 14/506,302, Oct. 19, 2016, 15 pages.

* cited by examiner

EFFICIENT NETWORK LAYER FOR IPV6 PROTOCOL

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Numerous electronic devices are now capable of connecting to wireless networks. For example, smart meter technology employs a wireless network to communicate electrical energy consumption data associated with residential properties back to a utility for monitoring, billing, and the like. As such, a number of wireless networking standards are currently available to enable electronic devices to communicate with each other. Some smart meter implementations, for instance, employ Internet Protocol version 6 (IPv6) over Low power Wireless Personal Area Networks (6LoWPAN) to enable electronic devices to communicate with a smart meter. However, the currently available wireless networking standards such as 6LoWPAN may not be generally well equipped to support electronic devices dispersed throughout a residence or home for one or more practical scenarios. That is, the currently available wireless networking standards may not efficiently connect all electronic devices of a network in a secure yet simple, consumer-friendly manner in view of one or more known practical constraints. Moreover, for one or more practical scenarios, the currently available wireless networking standards may not provide an efficient way to add new electronic devices to an existing wireless network in an ad hoc manner.

Additionally, when providing a wireless network standard for electronic devices for use in and around a home, it would be beneficial to use a wireless network standard that provides an open protocol for different devices to learn how to gain access to the network. Also, given the number of electronic devices that may be associated with a home, it would be beneficial that the wireless network standard be capable of supporting Internet Protocol version 6 (IPv6) communication such that each device may have a unique IP address and may be capable of being accessed via the Internet, via a local network in a home environment, and the like. Further, it would be beneficial for the wireless network standard to allow the electronic devices to communicate within the wireless network using a minimum amount of power. With these features in mind, it is believed that one or more shortcomings is presented by each known currently available wireless networking standard in the context of providing a low power, IPv6-based, wireless mesh network standard that has an open protocol and can be used for electronic devices in and around a home. For example, wireless network standards such as Bluetooth®, Dust Networks®, Z-wave®, WiFi, and ZigBee® fail to provide one or more of the desired features discussed above.

Bluetooth®, for instance, generally provides a wireless network standard for communicating over short distances via short-wavelength radio transmissions. As such, Bluetooth's® wireless network standard may not support a communication network of a number of electronic devices disposed throughout a home. Moreover, Bluetooth's® wireless network standard may not support wireless mesh communication or IPv6 addresses.

As mentioned above, the wireless network standard provide by Dust Networks® may also bring about one or more shortcomings with respect to one or more features that would enable electronic devices disposed in a home to efficiently communicate with each other. In particular, Dust Networks'® wireless network standard may not provide an open protocol that may be used by others to interface with the devices operating on Dust Networks' network. Instead, Dust Networks® may be designed to facilitate communication between devices located in industrial environments such as assembly lines, chemical plants, and the like. As such, Dust Networks'® wireless network standard may be directed to providing a reliable communication network that has pre-defined time windows in which each device may communicate to other devices and listen for instructions from other devices. In this manner, Dust Networks'® wireless network standard may require sophisticated and relatively expensive radio transmitters that may not be economical to implement with consumer electronic devices for use in the home.

Like Dust Networks'® wireless network standard, the wireless network standard associated with Z-wave® may not be an open protocol. Instead, Z-wave's® wireless network standard may be available only to authorized clients that embed a specific transceiver chip into their device. Moreover, Z-wave's® wireless network standard may not support IPv6-based communication. That is, Z-wave's® wireless network standard may require a bridge device to translate data generated on a Z-wave® device into IP-based data that may be transmitted via the Internet.

Referring now to ZigBee's® wireless network standards, ZigBee® has two standards commonly known as ZigBee® Pro and ZigBee® IP. Moreover, ZigBee® Pro may have one or more shortcomings in the context of support for wireless mesh networking Instead, ZigBee®Pro may depend at least in part on a central device that facilitates communication between each device in the ZigBee® Pro network. In addition to the increased power requirements for that central device, devices that remain on to process or reject certain wireless traffic can generate additional heat within their housings that may alter some sensor readings, such as temperature readings, acquired by the device. Since such sensor readings may be useful in determining how each device within the home may operate, it may be beneficial to avoid unnecessary generation of heat within the device that may alter sensor readings. Additionally, ZigBee® Pro may not support IPv6 communication.

Referring now to ZigBee® IP, ZigBee® IP may bring about one or more shortcomings in the context of direct device-to-device communication. ZigBee® IP is directed toward the facilitation of communication by relay of device data to a central router or device. As such, the central router or device may require constant powering and therefore may not represent a low power means for communications among devices. Moreover, ZigBee® IP may have a practical limit in the number of nodes (i.e., ~20 nodes per network) that may be employed in a single network. Further, ZigBee® IP uses a "Ripple" routing protocol (RPL) that may exhibit high bandwidth, processing, and memory requirements, which may implicate additional power for each ZigBee® IP connected device.

Like the ZigBee® wireless network standards discussed above, WiFi's wireless network may exhibit one or more shortcomings in terms of enabling communications among devices having low-power requirements. For example, WiFi's wireless network standard may also require each networked device to always be powered up, and furthermore may require the presence of a central node or hub. As known in the art, WiFi is a relatively common wireless network standard that may be ideal for relatively high bandwidth data transmissions (e.g., streaming video, syncing devices). As such, WiFi devices are typically coupled to a continuous power supply or rechargeable batteries to support the constant stream of data transmissions between devices. Further, WiFi's wireless network may not support wireless mesh networking.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Embodiments of the present disclosure relate to an electronic device such as a thermostat that may be disposed in a building (e.g., home or office) such that the electronic device may wirelessly communicate with another electronic device disposed in the same building. In one embodiment, the electronic device may include a network interface that may enable the electronic device to wirelessly couple the electronic device to the other electronic device via a wireless mesh network. The electronic device may also include a processor that may determine at least one data path via the wireless mesh network to the other electronic device using a Routing Information Protocol-Next Generation (RIPng) routing mechanism and the network interface. After identifying at least one data path to the other electronic device, the processor may determine whether the identified data path(s) is secure using a Datagram Transport Layer Security (DTLS) protocol. If the identified data path(s) is determined to be secure, the processor may send Internet Protocol version 6 (IPv6) data packets to the other electronic device via the secure data path(s). As a result, the electronic device may establish a secure communication network between itself and the other electronic device disposed in the same building with relatively little user input.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

Figure 1:
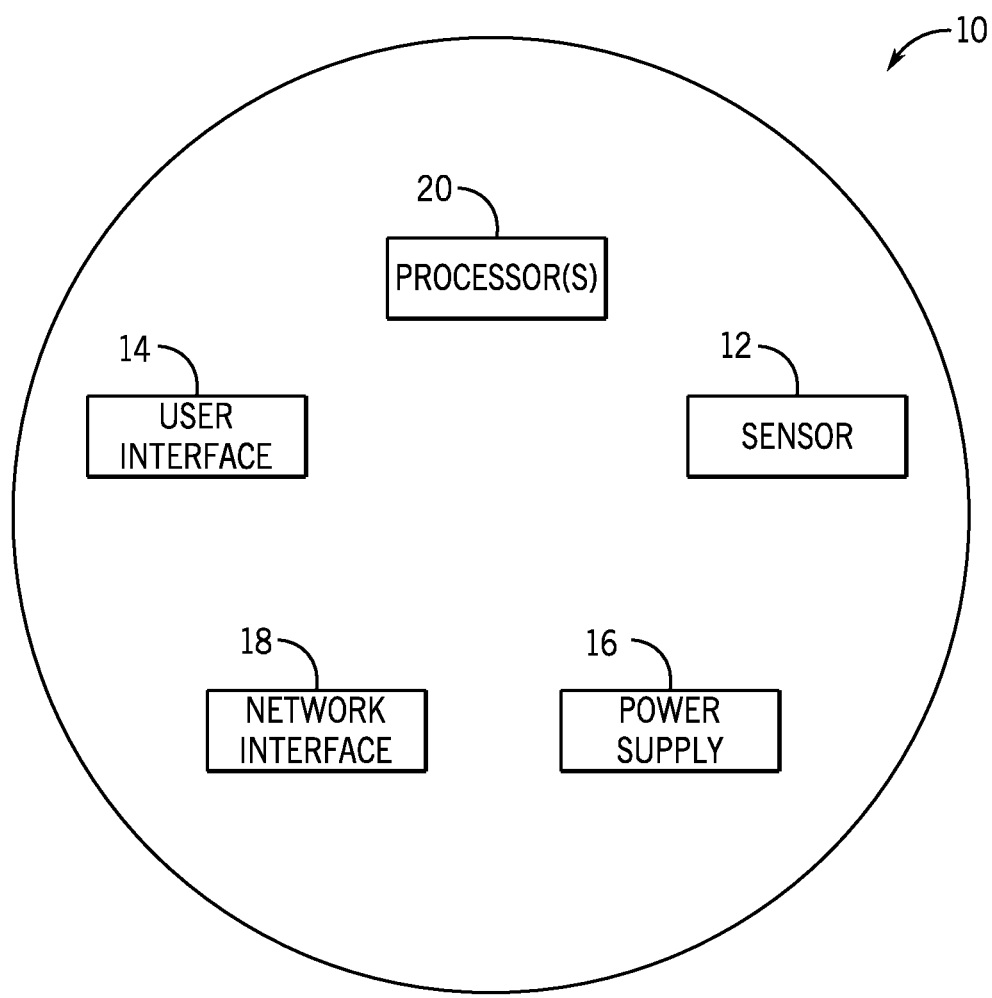
FIG. 1 illustrates a block diagram of a general device that may communicate with other devices disposed in a home environment using an efficient network layer protocol, in accordance with an embodiment.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Embodiments of the present disclosure relate generally to an efficient network layer that may be used by devices communicating with each other in a home environment. Generally, consumers living in homes may find it useful to coordinate the operations of various devices within their home such that all of their devices are operated efficiently.

For example, a thermostat device may be used to detect a temperature of a home and coordinate the activity of other devices (e.g., lights) based on the detected temperature. In this example, the thermostat device may detect a temperature that may indicate that the temperature outside the home corresponds to daylight hours. The thermostat device may then convey to the light device that there may be daylight available to the home and that thus the light should turn off.

In addition to operating their devices efficiently, consumers generally prefer to use user-friendly devices that involve a minimum amount of set up or initialization. That is, consumers would generally prefer to purchase devices that are fully operational after performing a few number initialization steps that may be performed by almost any individual regardless of age or technical expertise.

Keeping this in mind, to enable devices to effectively communicate data between each other within the home environment with minimal user involvement, the devices may use an efficient network layer to manage their communication. That is, the efficient network layer may establish a communication network in which numerous devices within a home may communicate with each other via a wireless mesh network. The communication network may support Internet Protocol version 6 (IPv6) communication such that each connected device may have a unique Internet Protocol (IP) address. Moreover, to enable each device to integrate with a home, it may be useful for each device to communicate within the network using low amounts of power. That is, by enabling devices to communicate using low power, the devices may be placed anywhere in a home without being coupled to a continuous power source.

The efficient network layer may thus establish a procedure in which data may be transferred between two or more devices such that the establishment of the communication network involves little user input, the communication between devices involves little energy, and the communication network, itself, is secure. In one embodiment, the efficient network layer may be an IPv6-based communication network that employs Routing Information Protocol-Next Generation (RIPng) as its routing mechanism and may use a Datagram Transport Layer Security (DTLS) protocol as its security mechanism. As such, the efficient network layer may provide a simple means for adding or removing devices to a home while protecting the information communicated between the connected devices.

By way of introduction, FIG. 1 illustrates an example of a general device 10 that may that may communicate with other like devices within a home environment. In one embodiment, the device 10 may include one or more sensors 12, a user-interface component 14, a power supply 16 (e.g., including a power connection and/or battery), a network interface 18, a processor 20, and the like. Particular sensors 12, user-interface components 14, and power-supply configurations may be the same or similar with each devices 10. However, it should be noted that in some embodiments, each device 10 may include particular sensors 12, user-interface components 14, power-supply configurations, and the like based on a device type or model.

The sensors 12, in certain embodiments, may detect various properties such as acceleration, temperature, humidity, water, supplied power, proximity, external motion, device motion, sound signals, ultrasound signals, light signals, fire, smoke, carbon monoxide, global-positioning-satellite (GPS) signals, radio-frequency (RF), other electromagnetic signals or fields, or the like. As such, the sensors 12 may include temperature sensor(s), humidity sensor(s), hazard-related sensor(s) or other environmental sensor(s), accelerometer(s), microphone(s), optical sensors up to and including camera(s) (e.g., charged coupled-device or video cameras), active or passive radiation sensors, GPS receiver(s) or radiofrequency identification detector(s). While FIG. 1 illustrates an embodiment with a single sensor, many embodiments may include multiple sensors. In some instances, the device 10 may includes one or more primary sensors and one or more secondary sensors. Here, the primary sensor(s) may sense data central to the core operation of the device (e.g., sensing a temperature in a thermostat or sensing smoke in a smoke detector), while the secondary sensor(s) may sense other types of data (e.g., motion, light or sound), which can be used for energy-efficiency objectives or smart-operation objectives.

One or more user-interface components 14 in the device 10 may receive input from the user and/or present information to the user. The received input may be used to determine a setting. In certain embodiments, the user-interface components may include a mechanical or virtual component that responds to the user's motion. For example, the user can mechanically move a sliding component (e.g., along a vertical or horizontal track) or rotate a rotatable ring (e.g., along a circular track), or the user's motion along a touchpad may be detected. Such motions may correspond to a setting adjustment, which can be determined based on an absolute position of a user-interface component 104 or based on a displacement of a user-interface components 104 (e.g., adjusting a set point temperature by 1 degree F. for every 10° rotation of a rotatable-ring component). Physically and virtually movable user-interface components can allow a user to set a setting along a portion of an apparent continuum. Thus, the user may not be confined to choose between two discrete options (e.g., as would be the case if up and down buttons were used) but can quickly and intuitively define a setting along a range of possible setting values. For example, a magnitude of a movement of a user-interface component may be associated with a magnitude of a setting adjustment, such that a user may dramatically alter a setting with a large movement or finely tune a setting with a small movement.

The user-interface components 14 may also include one or more buttons (e.g., up and down buttons), a keypad, a number pad, a switch, a microphone, and/or a camera (e.g., to detect gestures). In one embodiment, the user-interface component 14 may include a click-and-rotate annular ring component that may enable the user to interact with the component by rotating the ring (e.g., to adjust a setting) and/or by clicking the ring inwards (e.g., to select an adjusted setting or to select an option). In another embodiment, the user-interface component 14 may include a camera that may detect gestures (e.g., to indicate that a power or alarm state of a device is to be changed). In some instances, the device 10 may have one primary input component, which may be used to set a plurality of types of settings. The user-interface components 14 may also be configured to present information to a user via, e.g., a visual display (e.g., a thin-film-transistor display or organic light-emitting-diode display) and/or an audio speaker.

The power-supply component 16 may include a power connection and/or a local battery. For example, the power connection may connect the device 10 to a power source such as a line voltage source. In some instances, an AC power source can be used to repeatedly charge a (e.g., rechargeable) local battery, such that the battery may be used later to supply power to the device 10 when the AC power source is not available.

The network interface 18 may include a component that enables the device 10 to communicate between devices. In one embodiment, the network interface 18 may communicate using an efficient network layer as part of its Open Systems Interconnection (OSI) model. In one embodiment, the efficient network layer, which will be described in more detail below with reference to FIG. 5, may enable the device 10 to wirelessly communicate IPv6-type data or traffic using a RIPng routing mechanism and a DTLS security scheme. As such, the network interface 18 may include a wireless card or some other transceiver connection.

The processor 20 may support one or more of a variety of different device functionalities. As such, the processor 20 may include one or more processors configured and programmed to carry out and/or cause to be carried out one or more of the functionalities described herein. In one embodiment, the processor 20 may include general-purpose processors carrying out computer code stored in local memory (e.g., flash memory, hard drive, random access memory), special-purpose processors or application-specific integrated circuits, combinations thereof, and/or using other types of hardware/firmware/software processing platforms. Further, the processor 20 may be implemented as localized versions or counterparts of algorithms carried out or governed remotely by central servers or cloud-based systems, such as by virtue of running a Java virtual machine (JVM) that executes instructions provided from a cloud server using Asynchronous JavaScript and XML (AJAX) or similar protocols. By way of example, the processor 20 may detect when a location (e.g., a house or room) is occupied, up to and including whether it is occupied by a specific person or is occupied by a specific number of people (e.g., relative to one or more thresholds). In one embodiment, this detection can occur, e.g., by analyzing microphone signals, detecting user movements (e.g., in front of a device), detecting openings and closings of doors or garage doors, detecting wireless signals, detecting an IP address of a received signal, detecting operation of one or more devices within a time window, or the like. Moreover, the processor 20 may include image recognition technology to identify particular occupants or objects.

In certain embodiments, the processor 20 may also include a high-power processor and a low-power processor. The high-power processor may execute computationally intensive operations such as operating the user-interface component 14 and the like. The low-power processor, on the other hand, may manage less complex processes such as detecting a hazard or temperature from the sensor 12. In one embodiment, the low-power processor may wake or initialize the high-power processor for computationally intensive processes.

In some instances, the processor 20 may predict desirable settings and/or implement those settings. For example, based on the presence detection, the processor 20 may adjust device settings to, e.g., conserve power when nobody is home or in a particular room or to accord with user preferences (e.g., general at-home preferences or user-specific preferences). As another example, based on the detection of a particular person, animal or object (e.g., a child, pet or lost object), the processor 20 may initiate an audio or visual indicator of where the person, animal or object is or may initiate an alarm or security feature if an unrecognized person is detected under certain conditions (e.g., at night or when lights are off).

In some instances, devices may interact with each other such that events detected by a first device influences actions of a second device. For example, a first device can detect that a user has pulled into a garage (e.g., by detecting motion in the garage, detecting a change in light in the garage or detecting opening of the garage door). The first device can transmit this information to a second device via the efficient network layer, such that the second device can, e.g., adjust a home temperature setting, a light setting, a music setting, and/or a security-alarm setting. As another example, a first device can detect a user approaching a front door (e.g., by detecting motion or sudden light pattern changes). The first device may, e.g., cause a general audio or visual signal to be presented (e.g., such as sounding of a doorbell) or cause a location-specific audio or visual signal to be presented (e.g., to announce the visitor's presence within a room that a user is occupying).

By way of example, the device 10 may include a thermostat such as a Nest® Learning Thermostat. Here, the thermostat may include sensors 12 such as temperature sensors, humidity sensors, and the like such that the thermostat may determine present climate conditions within a building where the thermostat is disposed. The power-supply component 16 for the thermostat may be a local battery such that the thermostat may be placed anywhere in the building without regard to being placed in close proximity to a continuous power source. Since the thermostat may be powered using a local battery, the thermostat may minimize its energy use such that the battery is rarely replaced.

In one embodiment, the thermostat may include a circular track that may have a rotatable ring disposed thereon as the user-interface component 14. As such, a user may interact with or program the thermostat using the rotatable ring such that the thermostat controls the temperature of the building by controlling a heating, ventilation, and air-conditioning (HVAC) unit or the like. In some instances, the thermostat may determine when the building may be vacant based on its programming. For instance, if the thermostat is programmed to keep the HVAC unit powered off for an extended period of time, the thermostat may determine that the building will be vacant during this period of time. Here, the thermostat may be programmed to turn off light switches or other electronic devices when it determines that the building is vacant. As such, the thermostat may use the network interface 18 to communicate with a light switch device such that it may send a signal to the light switch device when the building is determined to be vacant. In this manner, the thermostat may efficiently manage the energy use of the building.

Figure 2:
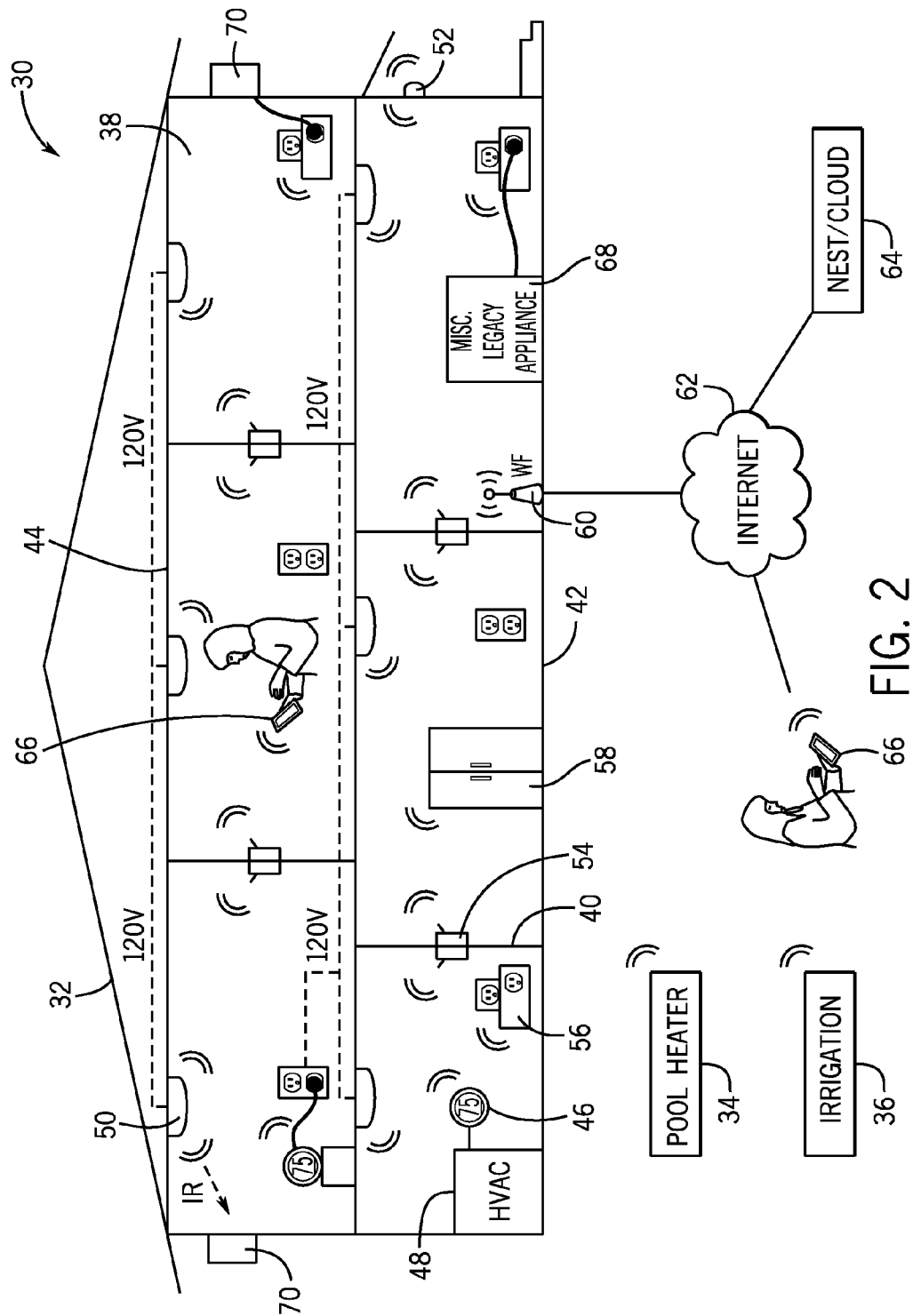
FIG. 2 illustrates a block diagram of a home environment in which the general device of FIG. 1 may communicate with other devices via the efficient network layer protocol, in accordance with an embodiment.

Keeping the foregoing in mind, FIG. 2 illustrates a block diagram of a home environment 30 in which the device 10 of FIG. 1 may communicate with other devices via the efficient network layer. The depicted home environment 30 may include a structure 32 such as a house, office building, garage, or mobile home. It will be appreciated that devices can also be integrated into a home environment that does not include an entire structure 32, such as an apartment, condominium, office space, or the like. Further, the home environment 30 may control and/or be coupled to devices outside of the actual structure 32. Indeed, several devices in the home environment 30 need not physically be within the structure 32 at all. For example, a device controlling a pool heater 34 or irrigation system 36 may be located outside of the structure 32.

The depicted structure 32 includes a number of rooms 38, separated at least partly from each other via walls 40. The walls 40 can include interior walls or exterior walls. Each room 38 can further include a floor 42 and a ceiling 44.

Devices can be mounted on, integrated with and/or supported by the wall 40, the floor 42, or the ceiling 44.

The home environment 30 may include a plurality of devices, including intelligent, multi-sensing, network-connected devices that may integrate seamlessly with each other and/or with cloud-based server systems to provide any of a variety of useful home objectives. One, more or each of the devices illustrated in the home environment 30 may include one or more sensors 12, a user interface 14, a power supply 16, a network interface 18, a processor 20 and the like.

Example devices 10 may include a network-connected thermostat 46 such as Nest® Learning Thermostat-1st Generation T100577 or Nest® Learning Thermostat-2nd Generation T200577. The thermostat 46 may detect ambient climate characteristics (e.g., temperature and/or humidity) and control a heating, ventilation and air-conditioning (HVAC) system 48. Another example device 10 may include a hazard detection unit 50 such as a hazard detection unit by Nest®. The hazard detection unit 50 may detect the presence of a hazardous substance and/or a hazardous condition in the home environment 30 (e.g., smoke, fire, or carbon monoxide). Additionally, an entryway interface devices 52, which can be termed a "smart doorbell", can detect a person's approach to or departure from a location, control audible functionality, announce a person's approach or departure via audio or visual means, or control settings on a security system (e.g., to activate or deactivate the security system).

In certain embodiments, the device 10 may include a light switch 54 that may detect ambient lighting conditions, detect room-occupancy states, and control a power and/or dim state of one or more lights. In some instances, the light switches 54 may control a power state or speed of a fan, such as a ceiling fan.

Additionally, wall plug interfaces 56 may detect occupancy of a room or enclosure and control supply of power to one or more wall plugs (e.g., such that power is not supplied to the plug if nobody is at home). The device 10 within the home environment 30 may further include an appliance 58, such as refrigerators, stoves and/or ovens, televisions, washers, dryers, lights (inside and/or outside the structure 32), stereos, intercom systems, garage-door openers, floor fans, ceiling fans, whole-house fans, wall air conditioners, pool heaters 34, irrigation systems 36, security systems, and so forth. While descriptions of FIG. 2 may identify specific sensors and functionalities associated with specific devices, it will be appreciated that any of a variety of sensors and functionalities (such as those described throughout the specification) may be integrated into the device 10.

In addition to containing processing and sensing capabilities, each of the example devices described above may be capable of data communications and information sharing with any other device, as well as to any cloud server or any other device that is network-connected anywhere in the world. In one embodiment, the devices 10 may send and receive communications via the efficient network layer that will be discussed below with reference to FIG. 5. In one embodiment, the efficient network layer may enable the devices 10 to communicate with each other via a wireless mesh network. As such, certain devices may serve as wireless repeaters and/or may function as bridges between devices in the home environment that may not be directly connected (i.e., one hop) to each other.

In one embodiment, a wireless router 60 may further communicate with the devices 10 in the home environment 30 via the wireless mesh network. The wireless router 60 may then communicate with the Internet 62 such that each device 10 may communicate with a central server or a cloud-computing system 64 through the Internet 62. The central server or cloud-computing system 64 may be associated with a manufacturer, support entity or service provider associated with a particular device 10. As such, in one embodiment, a user may contact customer support using a device itself rather than using some other communication means such as a telephone or Internet-connected computer. Further, software updates can be automatically sent from the central server or cloud-computing system 64 to the devices (e.g., when available, when purchased, or at routine intervals).

By virtue of network connectivity, one or more of the devices 10 may further allow a user to interact with the device even if the user is not proximate to the device. For example, a user may communicate with a device using a computer (e.g., a desktop computer, laptop computer, or tablet) or other portable electronic device (e.g., a smartphone) 66. A webpage or application may receive communications from the user and control the device 10 based on the received communications. Moreover, the webpage or application may present information about the device's operation to the user. For example, the user can view a current set point temperature for a device and adjust it using a computer that may be connected to the Internet 62. In this example, the thermostat 46 may receive the current set point temperature view request via the wireless mesh network created using the efficient network layer.

In certain embodiments, the home environment 30 may also include a variety of non-communicating legacy appliances 68, such as old conventional washer/dryers, refrigerators, and the like which can be controlled, albeit coarsely (ON/OFF), by virtue of the wall plug interfaces 56. The home environment 30 may further include a variety of partially communicating legacy appliances 70, such as infrared (IR) controlled wall air conditioners or other IR-controlled devices, which can be controlled by IR signals provided by the hazard detection units 50 or the light switches 54.

Figure 3:
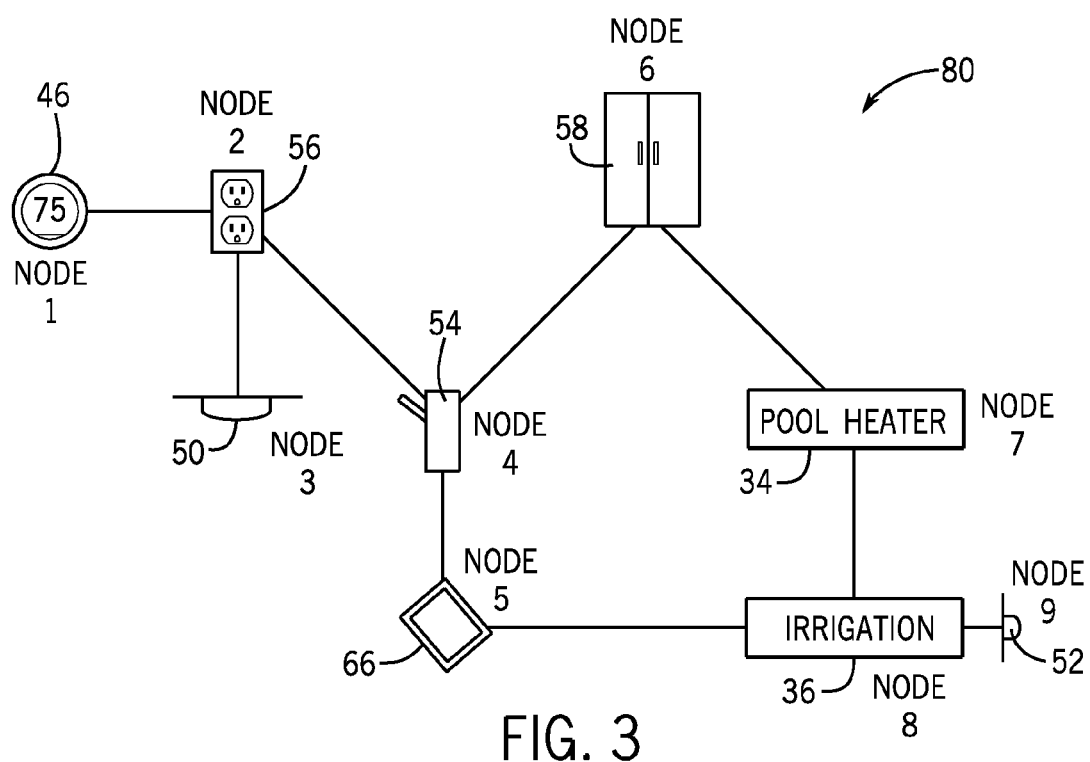
FIG. 3 illustrates an example wireless mesh network associated with the devices depicted in the home environment of FIG. 2, in accordance with an embodiment.

As mentioned above, each of the example devices 10 described above may establish a wireless mesh network such that data may be communicated to each device 10. Keeping the example devices of FIG. 2 in mind, FIG. 3 illustrates an example wireless mesh network 80 that may be employed to facilitate communication between some of the example devices described above. As shown in FIG. 3, the thermostat 46 may have a direct wireless connection to the plug interface 56, which may be wirelessly connected to the hazard detection unit 50 and to the light switch 54. In the same manner, the light switch 54 may be wirelessly coupled to the appliance 58 and the portable electronic device 66. The appliance 58 may just be coupled to the pool heater 34 and the portable electronic device 66 may just be coupled to the irrigation system 36. The irrigation system 36 may have a wireless connection to the entryway interface device 52. Each device in the wireless mesh network 80 of FIG. 3 may correspond to a node within the wireless mesh network 80. In one embodiment, the efficient network layer may specify that each node transmit data using a RIPng protocol and a DTLS protocol such that data may be securely transferred to a destination node via a minimum number of hops between nodes.

Figure 4:
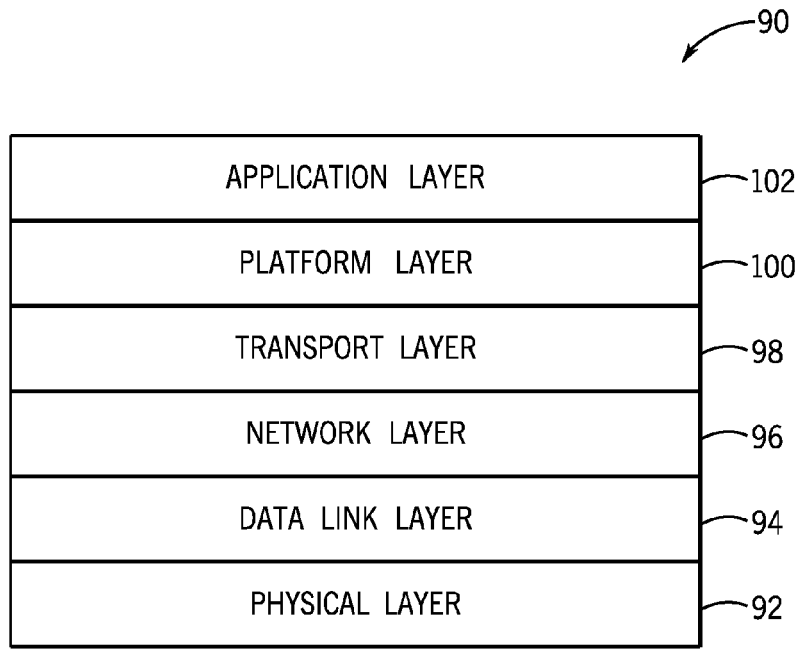
FIG. 4 illustrates a block diagram of an Open Systems Interconnection (OSI) model that characterizes a communication system for the home environment of FIG. 2, in accordance with an embodiment.

Generally, the efficient network layer may be part of an Open Systems Interconnection (OSI) model 90 as depicted in FIG. 4. The OSI model 90 illustrates functions of a communication system with respect to abstraction layers. That is, the OSI model may specify a networking framework or how communications between devices may be implemented. In one embodiment, the OSI model may include six layers: a physical layer 92, a data link layer 94, a network layer 96, a transport layer 98, a platform layer 100, and an application layer 102. Generally, each layer in the OSI model 90 may serve the layer above it and may be served by the layer below it.

Keeping this in mind, the physical layer 92 may provide hardware specifications for devices that may communicate with each other. As such, the physical layer 92 may establish how devices may connect to each other, assist in managing how communication resources may be shared between devices, and the like.

The data link layer 94 may specify how data may be transferred between devices. Generally, the data link layer 94 may provide a way in which data packets being transmitted may be encoded and decoded into bits as part of a transmission protocol.

The network layer 96 may specify how the data being transferred to a destination node is routed. The network layer 96 may also interface with a security protocol in the application layer 102 to ensure that the integrity of the data being transferred is maintained.

The transport layer 98 may specify a transparent transfer of the data from a source node to a destination node. The transport layer 98 may also control how the transparent transfer of the data remains reliable. As such, the transport layer 98 may be used to verify that data packets intended to transfer to the destination node indeed reached the destination node. Example protocols that may be employed in the transport layer 98 may include Transmission Control Protocol (TCP) and User Datagram Protocol (UDP).

The platform layer 100 may establish connections between devices according to the protocol specified within the transport layer 98. The platform layer 100 may also translate the data packets into a form that the application layer 102 may use. The application layer 102 may support a software application that may directly interface with the user. As such, the application layer 102 may implement protocols defined by the software application. For example, the software application may provide serves such as file transfers, electronic mail, and the like.

Figure 5:
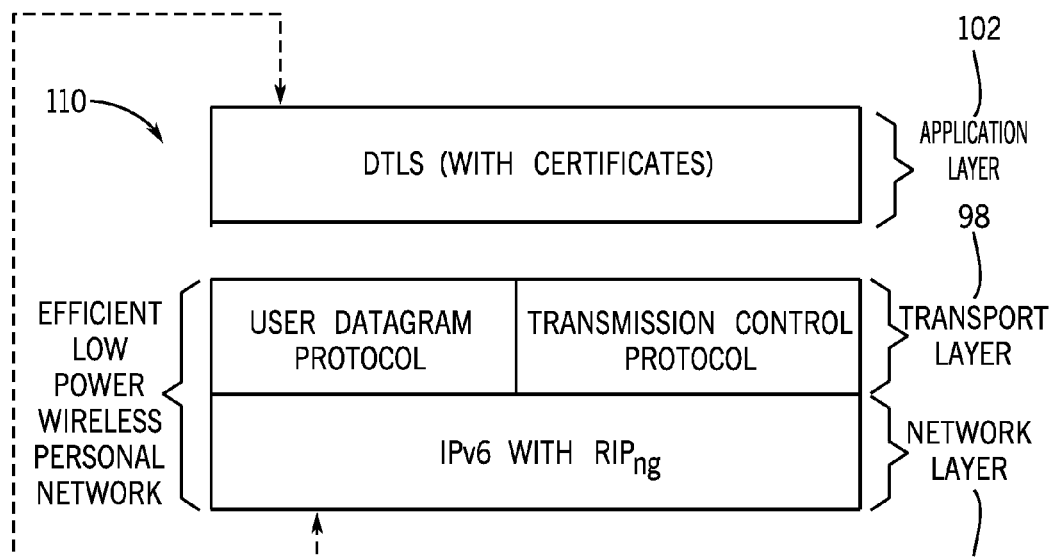
FIG. 5 illustrates a detailed view an efficient network layer in the OSI model of FIG. 4, in accordance with an embodiment.

Referring now to FIG. 5, in one embodiment, the network layer 96 and the transport layer 98 may be configured in a certain manner to form an efficient low power wireless personal network (ELoWPAN) 110. In one embodiment, the ELoWPAN 110 may be based on an IEEE 802.15.4 network, which may correspond to low-rate wireless personal area networks (LR-WPANs). The ELoWPAN 110 may specify that the network layer 96 may route data between the devices 10 in the home environment 30 using a communication protocol based on Internet Protocol version 6 (IPv6). As such, each device 10 may include a 128-bit IPv6 address that may provide each device 10 with a unique address to use to identify itself over the Internet, a local network around the home environment 30, or the like.

In one embodiment, the network layer 96 may specify that data may be routed between devices using Routing Information Protocol-Next Generation (RIPng). RIPng is a routing protocol that routes data via a wireless mesh network based on a number of hops between the source node and the destination node. That is, RIPng may determine a route to the destination node from the source node that employs the least number of hops when determining how the data will be routed. In addition to supporting data transfers via a wireless mesh network, RIPng is capable of supporting IPv6 networking traffic. As such, each device 10 may use a unique IPv6 address to identify itself and a unique IPv6 address to identify a destination node when routing data. Additional details with regard to how the RIPng may send data between nodes will be described below with reference to FIG. 6.

As mentioned above, the network layer 96 may also interface with a security protocol via the application layer 102 to manage the integrity of the data being transferred. As shown in FIG. 5, the efficient network layer may secure data transferred between devices using a Datagram Transport Layer Security (DTLS) protocol in the application layer 102. Generally, the efficient network layer may determine whether a communication pathway between devices 10 is secure using the DTLS protocol of the application layer 102. After the communication pathway is determined to be secure, the efficient network layer may facilitate secure data transfers between the devices 10. In this manner, the efficient network layer may enable data transfers using Transmission Control Protocol (TCP), User Datagram Protocol (UDP), and the like. Additional details with regard to the DTLS protocol will be described below with reference to FIGS. 8 and 9.

The network layer 96 depicted in FIG. 5 is characterized herein as the efficient network layer mentioned above. That is the efficient network layer routes IPv6 data using RIPng. Moreover, the efficient network layer may interface with the application layer 102 to employ the DTLS protocol to secure data transfer between devices. As a result, the transport layer 98 may support various types of (e.g., TCP and UDP) transfer schemes for the data.

Figure 6:
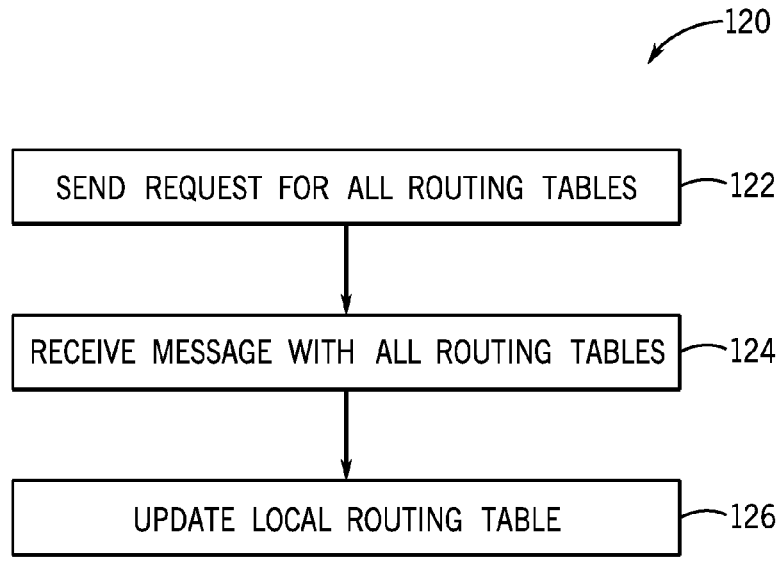
FIG. 6 illustrates a flowchart of a method for implementing a Routing Information Protocol-Next Generation (RIPng) network as a routing mechanism in the efficient network layer of FIG. 5, in accordance with an embodiment.

Referring now to FIG. 6, FIG. 6 depicts a flowchart of a method 120 that may be used for determining a routing table for each device 10 in the wireless mesh network 80 of FIG. 3 using RIPng. The method 120 may be performed by each device 10 in the home environment 30 such that each device 10 may generate a routing table that indicates how each node in the wireless mesh network 80 may be connected to each other. As such, each device 10 may independently determine how to route data to a destination node. In one embodiment, the processor 20 of the device 10 may perform the method 120 using the network interface 18. As such, the device 10 may send data associated with the sensor 12 or determined by the processor 18 to other devices 10 in the home environment 30 via network interface 18.

The following discussion of the method 120 will be described with reference to FIGS. 7A-7D to clearly illustrate various blocks of the method 120. Keeping this in mind and referring to both FIG. 6 and FIG. 7A, at block 122, the device 10 may send a request 132 to any other device 10 that may be directly (i.e., zero hops) to the requesting device 10. The request 132 may include a request for all of the routing information from the respective device 10. For example, referring to FIG. 7A, the device 10 at node 1 may send the request 132 to the device 10 at node 2 to send all of the routes (i.e., N2's routes) included in node 2's memory.

Figure 7A:
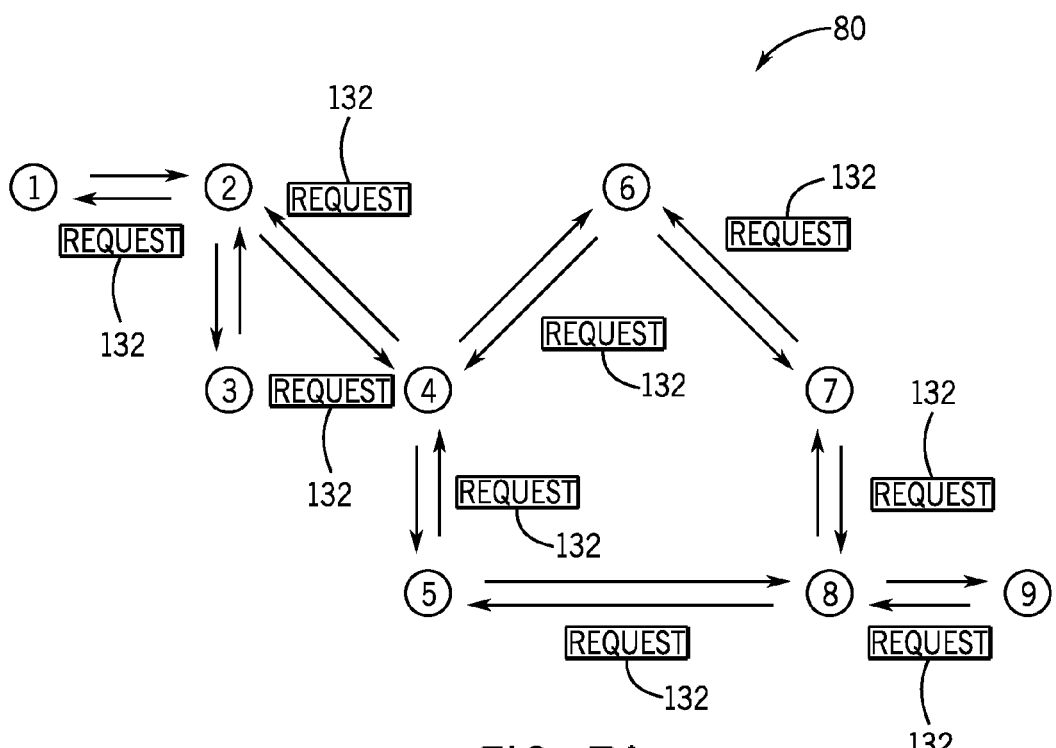
FIG. 7A-7D illustrates an example of how the RIPng network of the method of FIG. 6 can be implemented, in accordance with an embodiment.
Figure 7B:
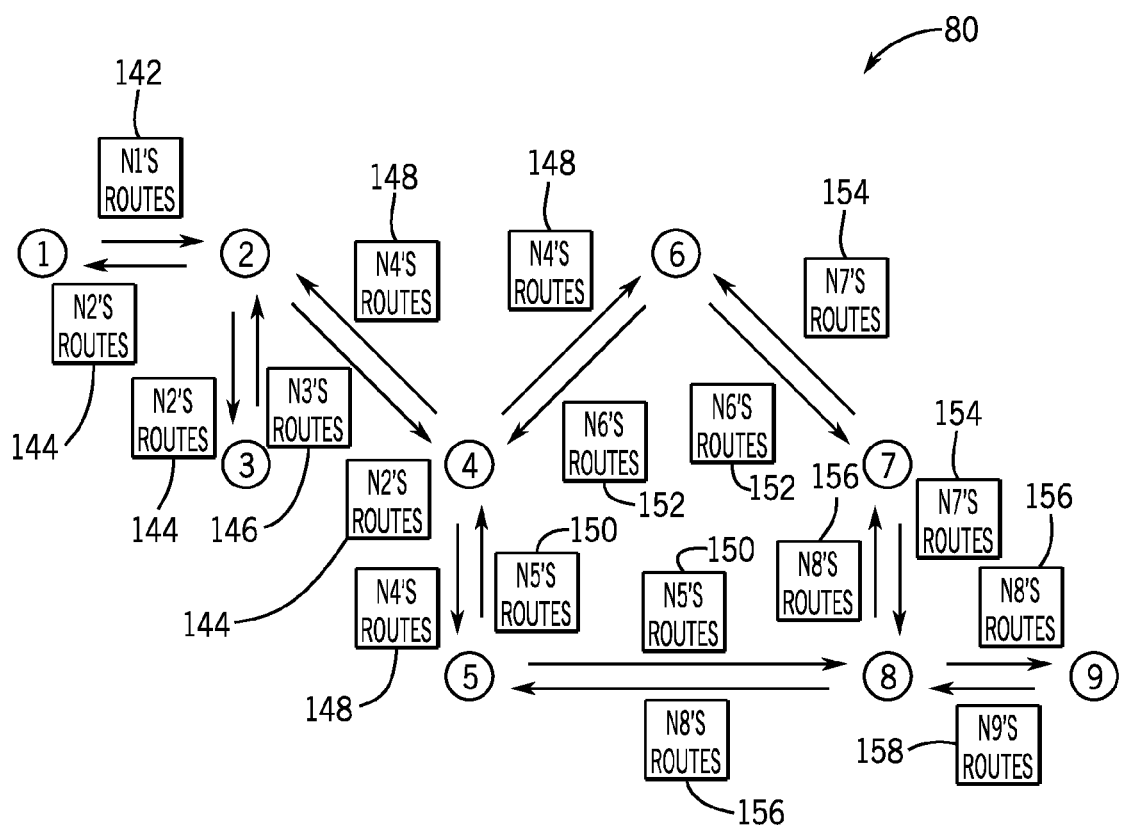

At block 124, the requesting device 10 may receive a message from the respective device 10 that may include all of the routes included in the respective memory of the respective device 10. The routes may be organized in a routing table that may specify how each node in the wireless mesh network 80 may be connected to each other. That is, the routing table may specify which intermediate nodes data may be transferred to such that data from a source node to a destination node. Referring back to the example above and to FIG. 7B, in response to node 1's request for N2's routes, at block 124, node 2 may send node 1 all of the routes (N2's routes 144) included in the memory or storage of node 2. In one embodiment, each node of the wireless mesh network 80 may send the request 132 to its adjacent node as shown in FIG. 7A. In response, each node may then send its routes to its adjacent node as shown in FIG. 7B. For instance, FIG. 7B illustrates how each node sends its route data to each adjacent node as depicted with N1's routes 142, N2's routes 144, N3's routes 146, N4's routes 148, N5's routes 150, N6's routes 152, N7's routes 154, N8's routes 156, and N9's routes 158.

Initially, each node may know the nodes in which it may have a direct connection (i.e., zero hops). For example, initially, node 2 may just know that it is directly connected to node 1, node 3, and node 4. However, after receiving N1's routes 142, N3's routes 146, and N4's routes 148, the processor 20 of node 2 may build a routing table that includes all of the information included with N1's routes 142, N3's routes 146, and N4's routes 148. As such, the next time node 2 receives a request for its routes or routing table (i.e., N2's routes 144), node 2 may send a routing table that includes N1's routes 142, N2's routes, N3's routes 146, and N4's routes 148.

Keeping this in mind and referring back to FIG. 6, at block 126, the requesting device 10 may update its local routing table to include the routing information received from the adjacent device 10. In certain embodiments, each device 10 may perform the method 120 periodically such that each device 10 includes an updated routing table that characterizes how each node in the wireless mesh network 80 may be connected to each other. As mentioned above, each time the method 120 is performed, each device 10 may receive additional information from its adjacent device 10 if the adjacent device 10 updated its routing table with the information received from its adjacent devices. As a result, each device 10 may understand how each node in the wireless mesh network 80 may be connected to each other.

Figure 7C:
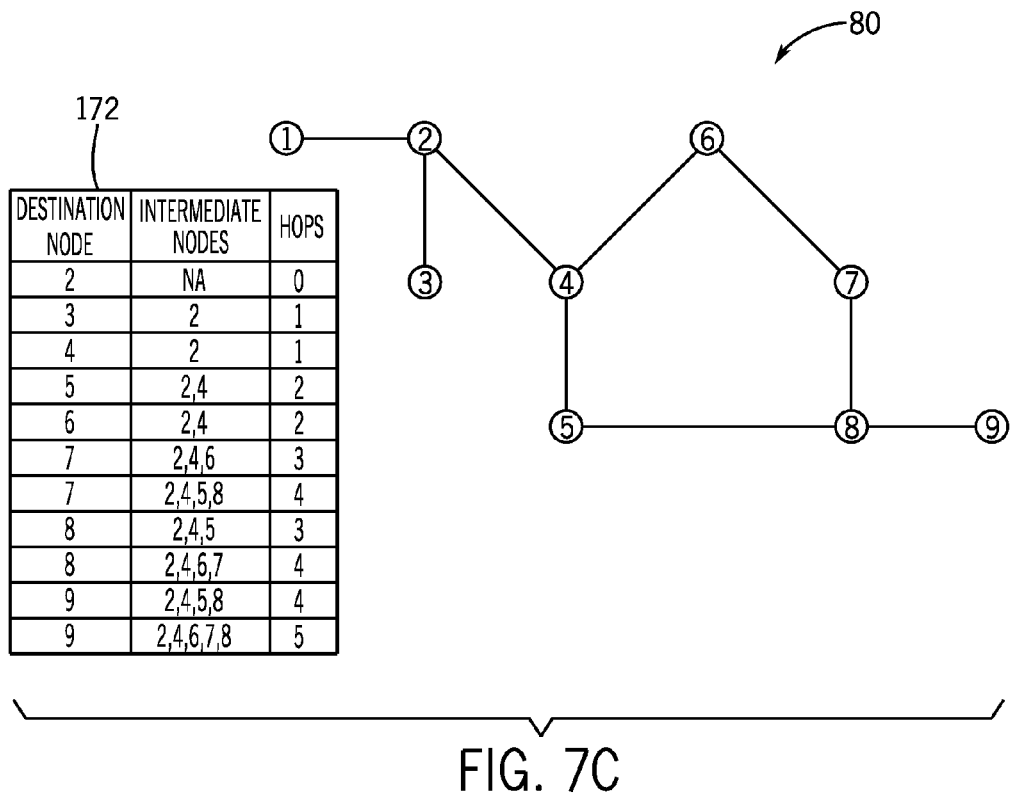

FIG. 7C, for example, illustrates a routing table 172 that may have been determined by the device 10 at node 1 using the method 120. In this example, the routing table 172 may specify each node in the wireless mesh network 80 as a destination node, the intermediate nodes between node 1 and each destination node, and a number of hops between node 1 and the destination node. The number of hops corresponds to a number of times that the data being sent to the destination node may be forwarded to an intermediate node before reaching the destination node. When sending data to a particular destination node, the RIPng routing scheme may select a route that involves the least number of hops. For instance, if node 1 intended to send data to node 9, the RIPng routing scheme would route the data via nodes 2, 4, 5, and 8, which includes four hops, as opposed to routing the data via nodes 2, 4, 6, 7, and 8, include includes five hops.

By using the RIPng routing scheme, each device 10 may independently determine how data should be routed to a destination node. Conventional routing schemes such as "Ripple" Routing Protocol (RPL) used in 6LoWPAN devices, on the other hand, may route data through a central node, which may be the only node that knows the structure of the wireless mesh network. More specifically, the RPL protocol may create a wireless mesh network according to a directed acyclic graph (DAG), which may be structured as a hierarchy. Located at the top of this hierarchy may include a border router, which may periodically multicast requests to lower level nodes to determine a rank for each of the node's connections. In essence, when data is transferred from a source node to a destination node, the data may be transferred up the hierarchy of nodes and then back down to the destination node. In this manner, the nodes located higher up the hierarchy may route data more often than the nodes located lower in the hierarchy. Moreover, the border router of the RPL system may also be operating more frequently since it controls how data will be routed via the hierarchy. In the conventional RPL system, in contrast to the RIPng system taught here, some nodes may route data on a more frequent basis simply due to its location within the hierarchy and not due to its location with respect to the source node and the destination node. These nodes that route data more often under the RPL system may consume more energy and thus may not be a suitable to implement with the devices 10 in the home environment 30 that operate using low power. Moreover, as mentioned above, if the border router or any other higher-level node of the RPL system corresponds to the thermostat 46, the increased data routing activity may increase the heat produced within the thermostat 46. As a result, the temperature reading of the thermostat 46 may incorrectly represent the temperature of the home environment 30. Since other devices 10 may perform specific operations based on the temperature reading of the thermostat 46, and since the thermostat 46 may send commands to various devices 10 based on its temperature reading, it may be beneficial to ensure that the temperature reading of the thermostat 46 is accurate.

Figure 7D:
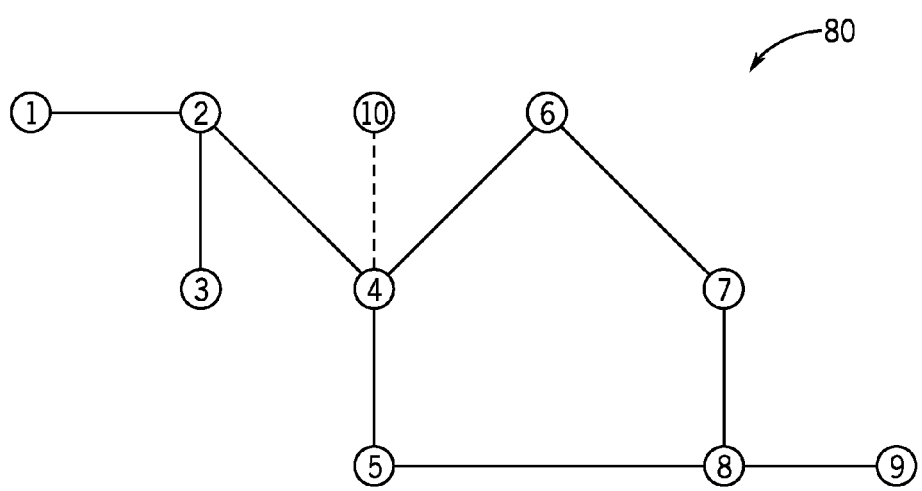

In addition to ensuring that none of the devices 10 routes data a disproportionate amount of times, by using the RIPng routing scheme, new devices 10 may be added to the wireless mesh network with minimum effort by the user. For example, FIG. 7D illustrates a new node 10 being added to the wireless mesh network 80. In certain embodiments, once the node 10 establishes a connection to the wireless mesh network 80 (e.g., via node 4), the device 10 that corresponds to node 10 may perform the method 120 described above to determine how data may be routed to each node in the wireless mesh network 80. If each node in the wireless mesh network 80 has already performed the method 120 multiple times, the device 10 at node 10 may receive the entire routing structure of the wireless mesh network 80 from the device 10 at node 4. In the same manner, devices 10 may be removed from the wireless mesh network 80 and each node may update its routing table with relative ease by performing the method 120 again.

After establishing a routing scheme using the RIPng routing scheme, ELoWPAN 110 may employ a DTLS protocol via the application layer 102 to secure data communications between each device 10 in the home environment 30. As mentioned above, after ensuring that a secure communication pathway exists between two communicating devices, ELoWPAN 110 may enable the transport layer 98 to send any type of data (e.g., TCP and UDP) via the secure communication pathway. Generally, new devices 10 added to the wireless mesh network 80 may use UDP data transfers to effectively communicate to other devices 10 in the wireless mesh network more quickly. Moreover, UDP data transfers generally use less energy by the device 10 that is sending or forwarding the data since there is no guarantee of delivery. As such, the devices 10 may send non-critical data (e.g., presence of a person in a room) using the UDP data transfer, thereby saving energy within the device 10. However, critical data (e.g., smoke alarm) may be sent via TCP data transfer to ensure that the appropriate party receives the data.

Figure 8:
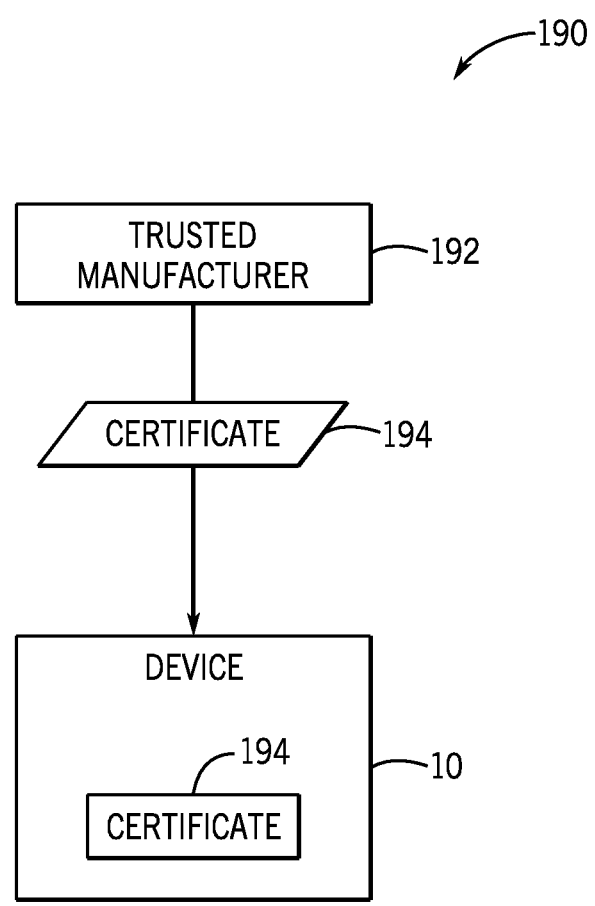
FIG. 8 illustrates a block diagram of a manufacturing process that includes embedding a security certificate into the general device of FIG. 1, in accordance with an embodiment.

Keeping the foregoing in mind, ELoWPAN 110 may employ the DTLS protocol to secure the data communicated between the devices 10. In one embodiment, the DTLS protocol may secure data transfers using a handshake protocol. Generally, the handshake protocol may authenticate each communicating device using a security certificate that may be provided by each device 10. FIG. 8 illustrates an example of a manufacturing process 190 that depicts how the security certificate may be embedded within the device 10.

Referring to FIG. 8, a trusted manufacturer 192 of the device 10 may be provided with a number of security certificates that it may use for each manufactured device. As such, while producing a device 10 that may be used in the home environment 30 and coupled to the wireless mesh network 80, the trusted manufacturer 192 may embed a certificate 194 into the device 10 during the manufacturing process 190. That is, the certificate 194 may be embedded into the hardware of the device 10 during manufacturing of the device 10. The certificate 194 may include a public key, a private key, or other cryptographic data that may be used to authenticate different communicating devices within the wireless mesh network 80. As a result, once a user receives the device 10, the user may integrate the device 10 into the wireless mesh network 80 without initializing or registering the device 10 with a central security node or the like.

In conventional data communication security protocols such as Protocol for Carrying Authentication for Network Access (PANA) used in 6LoWPAN devices, each device 10 may authenticate itself with a specific node (i.e., authentication agent). As such, before data is transferred between any two devices 10, each device 10 may authenticate itself with the authentication agent node. The authentication agent node may then convey the result of the authentication to an enforcement point node, which may be co-located with the authentication agent node. The enforcement point node may then establish a data communication link between the two devices 10 if the authentications are valid. Moreover, in PANA, each device 10 may communicate with each other via an enforcement point node, which may verify that the authentication for each device 10 is valid.

As such, by using the DTLS protocol rather than PANA to secure data transfers between nodes, the efficient network layer may avoid using an authorization agent node, an enforcement point node, or both excessively. That is, no one node using the efficient network layer may be processing authentication data for each data transfer between nodes in the wireless mesh network. As a result, the nodes using the efficient network layer may conserve more energy as compared to the authorization agent node or the enforcement point node in the PANA protocol system.

Figure 9:
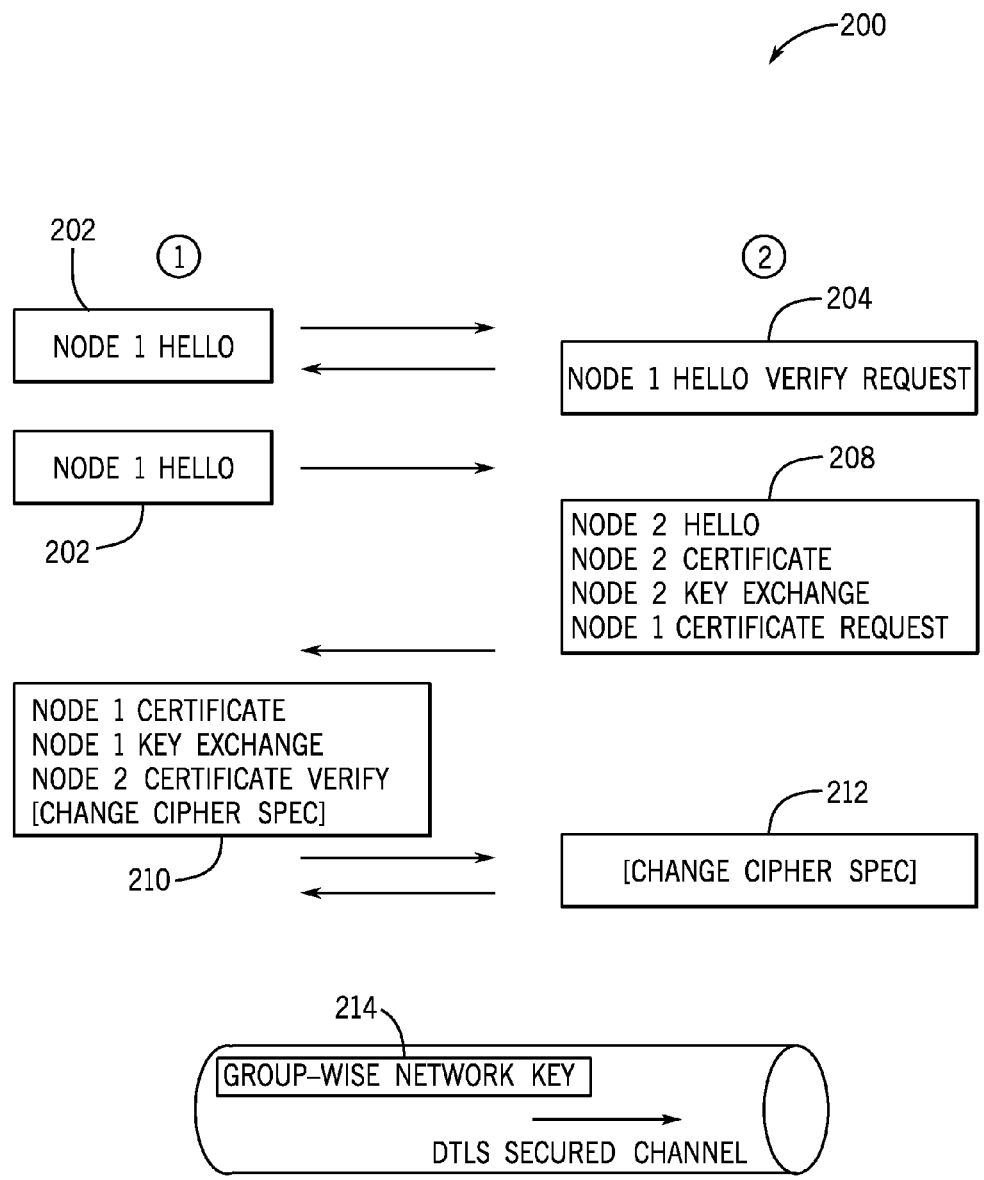
FIG. 9 illustrates an example handshake protocol between devices in the home environment of FIG. 2 using a Datagram Transport Layer Security (DTLS) protocol in the efficient network layer of FIG. 5, in accordance with an embodiment.

Keeping this in mind, FIG. 9 illustrates an example handshake protocol 200 that may be used between devices 10 when transferring data between each other. As shown in FIG. 9, the device 10 at node 1 may send a message 202 to the device 10 at node 2. The message 202 may be a hello message that may include cipher suites, hash and compression algorithms, and a random number. The device 10 at node 2 may then respond with a message 204, which may verify that the device 10 at node 2 received the message 202 from the device 10 at node 1.

After establishing the connection between node 1 and node 2, the device at node 1 may again send the message 202 to the device 10 at node 2. The device 10 at node 2 may then respond with a message 208, which may include a hello message from node 2, a certificate 194 from node 2, a key exchange from node 2, and a certificate request for node 1. The hello message in the message 208 may include cipher suites, hash and compression algorithms, and a random number. The certificate 194 may be the security certificate embedded within the device 10 by the trusted manufacturer 192 as discussed above with reference to FIG. 8. The key exchange may include a public key, a private key, or other cryptographic information that may be used to determine a secret key for establishing a communication channel between the two nodes. In one embodiment, the key exchange may be stored in the certificate 194 of the corresponding device 10 located at the respective node.

In response to the message 208, the device 10 at node 1 may send message 210 that may include a certificate 194 from node 1, a key exchange from node 1, a certificate verification of node 2, and a change cipher spec from node 1. In one embodiment, the device 10 at node 1 may use the certificate 194 of node 2 and the key exchange from node 1 to verify the certificate 194 of node 2. That is, the device 10 at node 1 may verify that the certificate 194 received from node 2 is valid based on the certificate 194 of node 2 and the key exchange from node 1. If the certificate 194 from node 2 is valid, the device 10 at node 1 may send the change cipher spec message to the device 10 at node 2 to announce that the communication channel between the two nodes is secure.

Similarly, upon receiving the message 210, the device 10 at node 2 may use the certificate 194 of node 1 and the key exchange from node 2 to verify the certificate 194 of node 1. That is, the device 10 at node 2 may verify that the certificate 194 received from node 1 is valid based on the certificate 194 of node 1 and the key exchange from node 2. If the certificate 194 from node 1 is valid, the device 10 at node 2 may also send the change cipher spec message to the device 10 at node 1 to announce that the communication channel between the two nodes is secure.

After establishing that the communication channel is secure, the device 10 at node 1 may send a group-wise network key 214 to the device 10 at node 2. The group-wise network key 214 may be associated with the ELoWPAN 110. In this manner, as new devices join the ELoWPAN 110, devices previously authorized to communicate within the ELoWPAN 110 may provide the new devices access to the ELoWPAN 110. That is, the devices previously authorized to communicate within the ELoWPAN 110 may provide the group-wise network key 214 to the new devices, which may enable the new devices to communicate with other devices in the ELoWPAN 110. For example, the group-wise network key 214 may be used to communicate with other devices that have been properly authenticated and that have previously provided with the group-wise network key 214. In one embodiment, once the change cipher spec message has been exchanged between the device 10 at node 1 and the device 10 at node 2, identification information such as model number, device capabilities, and the like may be communicated between the devices. However, after the device 10 at node 2 receives the group-wise network key 214, additional information such as data from sensors disposed on the device 10, data analysis performed by the device 10, and the like may be communicated between devices.

By embedding the security certificate within the device 10 during the manufacturing process, the device 10 may not involve the user with establishing security or authentication processes for the device 10. Moreover, since the device 10 may ensure that data is securely transferred between nodes based on a handshake protocol as opposed to a central authentication agent node, the security of the data transfers in the wireless mesh network 80 may not rely on a single node for security. Instead, the efficient network layer may ensure that data may be securely transferred between nodes even when some node becomes unavailable. As such, the efficient network layer may be much less vulnerable to security issues since it does not rely on a single node for securing data messages.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. An electronic device, comprising:
a network interface configured to wirelessly couple the electronic device to at least one other electronic device in a wireless mesh network; and
a processor configured to:
establish at least one mesh link to the at least one other electronic device via the network interface;
receive distance vector routing data having a routing table of distances, the distance vector routing data being received from the at least one other electronic device via the at least one mesh link, the routing table of distances comprising a plurality of destination electronic devices, intermediate electronic devices for routing data to each of the plurality of the destination electronic devices, and a number of hops of the intermediate electronic devices between the electronic device and the plurality of the destination electronic devices;
establish a session to communicate with one of the plurality of destination electronic devices using a Datagram Transport Layer Security (DTLS) protocol, packet data associated with the session being routed based on the received distance vector routing data; and
utilize an IPv6-based application layer protocol for communication between the electronic device and the one of the plurality of the destination electronic devices using the established session, the application layer communication of the session being secured at the electronic device and at the one of the plurality of the destination electronic devices using the DTLS protocol.

2. The electronic device of claim 1, wherein the electronic device and the at least one other electronic device are configured to be part of the wireless mesh network.

3. The electronic device of claim 1, wherein the routing table comprises the at least one mesh link.

4. The electronic device of claim 1, wherein the processor is configured to generate the routing table by:
sending a request for routing information to the at least one other electronic device having a direct communication connection to the electronic device;
receiving the routing information from the at least one other electronic device, wherein the routing information comprises an identification of electronic devices that are directly communicatively coupled to the at least one other electronic device; and
generating the routing table based at least in part on the routing information.

5. The electronic device of claim 1, wherein the routing table comprises an identification of one or more electronic devices that are communicatively coupled via one or more mesh links between the electronic device and the at least one other electronic device.

6. The electronic device of claim 1, wherein the processor is configured to update the routing table by:
sending a request for routing information to the at least one other electronic device communicatively coupled to an additional electronic device;
receiving the routing information from the at least one other electronic device, wherein the routing information comprises an identification of one or more electronic devices that are communicatively coupled to the at least one other electronic device and communicatively coupled to the additional electronic device; and
updating the routing table based at least in part on the identification of the electronic devices.

7. The electronic device of claim 1, wherein the processor is configured to identify a security certificate embedded within the electronic device to establish the session.

8. The electronic device of claim 7, wherein the security certificate is embedded within the electronic device during a manufacturing process associated with the electronic device.

9. The electronic device of claim 1, wherein the distances of the vector routing data comprise a count of mesh links between the electronic device and each of the plurality of the destination electronic devices.

10. The electronic device of claim 1, wherein the processor is configured to utilize a private key and a public key when communicating between the electronic device and the at least one other electronic device.

11. The electronic device of claim 1, wherein the electronic device utilizes the at least one other electronic device to route the packet data in the DTLS session between the electronic device and the one of the plurality of the destination electronic devices.

12. A method for communicating between an electronic device and at least one other electronic device in a wireless mesh network, comprising:
establishing at least one mesh link to the at least one other electronic device via a network interface;
receiving distance vector routing data having a routing table of distances, the distance vector routing data being received from the at least one other electronic device via the at least one mesh link, the routing table of distances comprising a plurality of destination electronic devices, intermediate electronic devices for routing data to each of the plurality of the destination electronic devices, and a number of hops of the intermediate electronic devices between the electronic device and the plurality of the destination electronic devices;
establishing a session to communicate with one of the plurality of destination electronic devices using a Datagram Transport Layer Security (DTLS) protocol, packet data associated with the session being routed based on the received distance vector routing data; and
utilizing an IPv6-based application layer protocol for communication between the electronic device and the one of the plurality of the destination electronic devices using the established session, the application layer communication of the session being secured at the electronic device and at the one of the plurality of the destination electronic devices using the DTLS protocol.

13. The method of claim 10, comprising:
sending a request for routing information from the electronic device to the at least one other electronic device communicatively disposed between the electronic device and the one of the plurality of the destination electronic devices, wherein the routing information comprises an identification of electronic devices communicatively coupled to the at least one other electronic device; and
generating, at the electronic device, the routing table based at least in part on the routing information.

14. The method of claim 12, wherein the session is established when the electronic device determines that a certificate of the one of the plurality of the destination electronic devices is valid.

15. A non-transitory computer-readable medium comprising instructions for an electronic device to send or receive data in a wireless mesh network, wherein the instructions are configured to:

establish at least one mesh link to at least one other electronic device via a network interface;

receive distance vector routing data having a routing table of distances, the distance vector routing data being received from the at least one other electronic device via the at least one mesh link, the routing table of distances comprising a plurality of destination electronic devices, intermediate electronic devices for routing data to each of the plurality of the destination electronic devices, and a number of hops of the intermediate electronic devices between the electronic device and the plurality of the destination electronic devices;

establish a session to communicate with one of the plurality of the destination electronic devices using a Datagram Transport Layer Security (DTLS) protocol, packet data associated with the session being routed based on the received distance vector routing data; and utilize an IPv6-based application layer protocol for communication between the electronic device and the one of the plurality of the destination electronic devices using the established session, the application layer communication of the session being secured at the electronic device and at the one of the plurality of the destination electronic devices using the DTLS protocol.

16. The non-transitory computer-readable medium of claim 15, wherein the at least one other electronic device comprises a thermostat, a hazard detection unit, an entryway interface device, a light switch, a wall plug interface, a pool heater, an irrigation system, or any combination thereof.

17. The non-transitory computer-readable medium of claim 15, wherein the wireless mesh network is disposed throughout a house, an apartment, or an office.

18. The non-transitory computer-readable medium of claim 15, wherein the wireless mesh network is configured to communicatively couple to the Internet.

19. The non-transitory computer-readable medium of claim 15, wherein the instructions are configured to transport a DTLS packet in an Internet Protocol version 6 (IPv6) data packet over the wireless mesh network.

20. The non-transitory computer-readable medium of claim 15, wherein the instructions are configured to encode or decode data communicated between the electronic device and the at least one other electronic devices on a data link layer.

* * * * *

UNITED STATES PATENT AND TRADEMARK OFFICE
CERTIFICATE OF CORRECTION

PATENT NO.        : 9,531,704 B2                                         Page 1 of 1
APPLICATION NO.   : 13/926312
DATED             : December 27, 2016
INVENTOR(S)       : Erickson et al.

It is certified that error appears in the above-identified patent and that said Letters Patent is hereby corrected as shown below:

In the Claims

Column 18, Line 57, delete "10", insert -- 12 --, therefor.

Signed and Sealed this
Fourteenth Day of March, 2017

Michelle K. Lee
*Director of the United States Patent and Trademark Office*